US012754145B2

(12) United States Patent
Jacobs et al.

(10) Patent No.: US 12,754,145 B2
(45) Date of Patent: Oct. 6, 2026

(54) LOCK-IN AVERAGING FOR SEMICONDUCTOR DIAGNOSTICS

(71) Applicants: Imec VZW, Leuven (BE); Katholieke Universiteit Leuven, KU LEUVEN R&D, Leuven (BE)

(72) Inventors: Kristof J. P. Jacobs, Lier (BE); Anjanashree Mankala Ramakrishna Sharma, Heverlee (BE)

(73) Assignees: Imec vzw, Leuven (BE); Katholieke Universiteit Leuven, Leuven (BE)

( * ) Notice: Subject to any disclaimer, the term of this patent is extended or adjusted under 35 U.S.C. 154(b) by 172 days.

(21) Appl. No.: 18/942,532

(22) Filed: Nov. 9, 2024

(65) Prior Publication Data

US 2025/0155381 A1 May 15, 2025

(30) Foreign Application Priority Data

Nov. 9, 2023 (EP) .................................... 23208726

(51) Int. Cl.
*G06T 7/00* (2017.01)
*G01N 21/88* (2006.01)
*G01N 21/95* (2006.01)

(52) U.S. Cl.
CPC ..... *G01N 21/9501* (2013.01); *G01N 21/8851* (2013.01); *G01N 2021/887* (2013.01)

(58) Field of Classification Search
CPC ........... G01N 21/9501; G01N 21/8851; G01N 2021/887; G06T 2207/10048;
(Continued)

(56) References Cited

U.S. PATENT DOCUMENTS 5,287,183 A * 2/1994 Thomas ................. H04N 23/73 348/E5.037
2010/0074515 A1* 3/2010 Zhao ...................... G01N 25/72 382/149

(Continued)

OTHER PUBLICATIONS

Extended European Search Report, Application No. EP 23208726.2 mailed Apr. 26, 2024, 8 pages.

(Continued)

*Primary Examiner* — Uzma Alam
*Assistant Examiner* — Mamadou Faye
(74) *Attorney, Agent, or Firm* — McDonnell Boehnen Hulbert & Berghoff, LLP; Chad A. Kamler

(57) ABSTRACT

Examples include a method for localizing one or more defects in a semiconductor device. The method includes switching the semiconductor device on and off at a first frequency and switching an irradiating device on and off at a second frequency. The method also includes acquiring images of the semiconductor device and lock-in averaging the images with a first reference signal having the first frequency and a first phase, to obtain amplitudes indicative of temperatures at a surface of the semiconductor device and/or phase signals indicative of a depth location of the one or more defects in the semiconductor device. The method also includes lock-in averaging the images with a second reference signal having the second frequency and a second phase to obtain a topography of the surface of the semiconductor device. The first frequency is different from the second frequency and/or the first phase is different from the second phase.

20 Claims, 7 Drawing Sheets

(58) Field of Classification Search
CPC . G06T 2207/20216; G06T 2207/20221; G06T 2207/30148; G06T 7/0004
See application file for complete search history.

(56) References Cited

U.S. PATENT DOCUMENTS

| | | | | |
|---|---|---|---|---|
| 2011/0297829 | A1* | 12/2011 | Altmann | G01N 21/88 250/340 |
| 2016/0202126 | A1* | 7/2016 | Schmidt | G01J 5/0096 250/342 |

OTHER PUBLICATIONS

Razani et al., "Lock-in thermography using a cellphone attachment infrared camera", AIP Advances, 2018, 8(3), 035305, 7 pages.
Schmidt et al., "Lock-in-Thermography for 3-dimensional localization of electrical defects inside complex packaged devices", ASM International, ISTFA 2008: Proceedings from the 34th International Symposium for Testing and Failure Analysis, 2008, 102-107.
Tariq et al., "Fusion of Thermal and Visible Acquisitions for Evaluating Production-borne Scratches and Shunts in Photo-Voltaic PV Cells", Journal of Materials Science Research, 2012, 1(4), 57-72.
Bauer et al., "Lock-in Thermography: A Versatile Tool for Failure Analysis of Solar Cells", ASM International, 2009, 11(3), 6-12.
Kaes et al., "Light-modulated Lock-in Thermography forPhotosensitive pn-Structures and Solar Cells", Progress in Photovoltaics: Research and Applications, 2004, vol. 12, 355-363.
Isenberg et al., "Realistic evaluation of power losses in solar cells by using thermographic methods", Journal of Applied Physics, 2004, 95(9), 5200-5209.
Singh et al., "Experimental Investigation of Thermal Actuation Crosstalk in Phase-Change RF Switches Using Transient Thermoreflectance Imaging", IEEE Transactions on Electron Devices, 2021, 68(7), 3537-3544.
Boue et al., "Open crack depth sizing by multi-speed continuous laser stimulated lock-in thermography", Measurement Science and Technology, 2017, 28(6), 65901, 12 pages.
Bahk et al., "Ultra-fast Thermoreflectance Imaging for Electronic Optoelectronic, and Thermal Devices", IEEE Bicmos and Compound Semiconductor Integrated Circuits and Technology Symposium (BCICTS), 2019, 7 pages.
Sharma et al., "Methods to enhance infrared imaging for defect localization using lock-in thermography", ISTFA, Department of Materials Engineering, KU Leuven, 2023, 5 pages.
Dahlberg et al., "Design and Construction of an LED-Based Excitation Source for Lock-In Thermography", Applied Sciences, 2022, vol. 12, 2940, 13 pages.
Breitenstein et al., "Thermal Failure Analysis by IR Lock-in Thermography", ASM International, Microelectronics Failure Analysis, 6th Edition, 2011, 330-339.
Ding et al., "Reconfigurable Laser-Stimulated Lock-In Thermography for Surface Micro-Crack Detection", Sensors, 2023, vol. 23, 10 pages.
Nolte et al., "Lock-in Thermography for the Development of New Materials", Materials Today: Proceedings, Apr. 2017, S128-S134, 7 pages.

* cited by examiner

LOCK-IN AVERAGING FOR SEMICONDUCTOR DIAGNOSTICS

CROSS-REFERENCE TO RELATED APPLICATIONS

The present application is a non-provisional patent application claiming priority to European patent application no. 23208726.2, filed Nov. 9, 2023, the contents of which are hereby incorporated by reference.

FIELD OF THE DISCLOSURE

The disclosure relates to the field of semiconductor diagnostics. More specifically, it relates to a method or device which uses lock-in averaging for localizing defects in a semiconductor device.

BACKGROUND

When a defect is present in a semiconductor device and the semiconductor device is operational (i.e. it is turned on), this will typically lead to an increased temperature around the defect in comparison with a device which does not have this defect. This is illustrated in FIG. 1 which shows the defect at the center of the semiconductor device and the thermal radiation resulting from this defect.

Defects which need to be detected may, for example, be shunt sites in a solar cell or shorts in an electronic circuit.

Among the various techniques used for failure analysis of advanced semiconductor technologies, lock-in thermography (LIT) is one of the methods for identifying sub-surface defects. It is used for the 3D localization of the defect in integrated circuit packages ([C. Schmidt, F. Altmann, C. Grosse, A. Lindner, and V. Gottschalk, "Lock-In-Thermography for 3-Dimensional Localization of Electrical Defects inside Complex Packaged Devices," presented at the ISTFA 2008, ASM International, November 2008, pp. 102-107. doi: 10.31399/asm.cp.istfa2008p0102]). The infrared images or the thermograms obtained from this technique generally have good resolution and contrast for pinpointing the defect efficiently. The quality of the thermograms depends on the sensitivity of the camera, detector technology, objective lenses, and the strength of the infrared signal radiated from the object. High-performance cameras needed for LIT are expensive and are not extensively commercialized ([M. Razani, A. Parkhimchyk, and N. Tabatabaei, "Lock-in thermography using a cellphone attachment infrared camera," AIP Advances, vol. 8, no. 3, p. 035305, March 2018, doi: 10.1063/1.5021601]). Several methods have been proposed to improve thermogram contrast but most of them are based on histogram modification. They are useful for enhancing the appearance of the thermograms but can sometimes lead to the suppression of the finer details of the image.

There is, therefore, a need for methods and devices that help increase the contrast of images in a semiconductor device, while assisting thermal enhancement of the LIT hotspot signal from the defect.

SUMMARY

It is a potential benefit of embodiments of this disclosure to provide a method and a device for localizing a defect in a semiconductor device wherein the defect results in an increased temperature at the location of the defect.

The above benefit can be accomplished by a method and device according to the present disclosure.

In a first aspect, embodiments of this disclosure relate to a method for localizing one or more defects in a semiconductor device. The method comprises:

switching the semiconductor device on and off at a first frequency, meanwhile switching an irradiating device, for irradiating the semiconductor device, on and off at a second frequency, and meanwhile acquiring images of the semiconductor device using a camera.

The method, furthermore, comprises:

lock-in averaging the acquired images with a first reference signal having the first frequency and a first phase to obtain amplitudes indicative of temperatures at a surface of the semiconductor device and/or phase signals indicative of a depth location of the one or more defects in the semiconductor device which are induced by switching the semiconductor device on and off, lock-in averaging of the acquired images with a second reference signal having the second frequency and a second phase to obtain a topography of the surface of the semiconductor device.

In embodiments, the first frequency is different from the second frequency and/or the first phase is different from the second phase.

In a method according to embodiments, the irradiation may be done using a plurality of light emitting diodes (LEDs). They may transmit IR-radiation. The irradiation of the semiconductor device may also be done using a laser or it may be done using a heater. In a method according to embodiments, an additional irradiation device may be switched on and off at an additional frequency, and an additional topography image may be acquired by lock-in averaging with a reference signal having the additional frequency and an additional phase. The method, furthermore, may comprise merging the topographic images.

It is a potential benefit of embodiments that simultaneously an image with a good topographical contrast as well as an amplitude image and/or phase signals for localizing a defect can be obtained. The resulting images from these two measurements may give a hotspot amplitude of a defect and a lock-in thermogram if the irradiation causes heating or a lock-in image if the irradiation is performed via illumination (e.g. infrared light) of the topography.

It is a potential benefit of embodiments that the temperature of semiconductor device can be reduced due to periodic heating.

It is a potential benefit of embodiments that the contrast of the topographical thermograms is improved. Since the topography obtained from this method is from a lock-in measurement, the data is averaged over several cycles, and hence is less sensitive to the input noise. Integrated topography images obtained from classical lock-in thermography can sometimes result in blurring due to crosstalk between consecutive frames.

In embodiments, the first frequency is equal to the second frequency and the first phase is shifted at least 90° with respect to the second phase.

In embodiments, the first frequency is different from the second frequency.

In embodiments, a method comprises localizing one or more defects on one or more locations by determining where the obtained amplitudes are larger than a predefined threshold.

In a second aspect, embodiments relate to a system for localizing one or more defects in a semiconductor device. The system comprises:

- a first signal generator for powering the semiconductor device on and off at a first frequency,
- a second signal generator and an irradiating device for irradiating the semiconductor device wherein the second signal generator 140B is configured for switching on and off the irradiating device at a second frequency,
- a camera configured for acquiring images of the semiconductor device. In embodiments, the camera is configured for acquiring the images at a frame rate which is at least twice the highest frequency of the signal generators.

The system, furthermore, comprises:

- a first lock-in device configured for lock-in averaging the acquired images with a first reference signal having the first frequency and a first phase to obtain amplitudes indicative of temperatures at a surface of the semiconductor device and/or phase signals indicative of a depth location of the one or more defects in the semiconductor device which are induced by powering the semiconductor device on and off,
- a second lock-in device configured for lock-in averaging the acquired images with a second reference signal having the second frequency and a second phase to obtain a topography of the surface of the semiconductor device.

In embodiments, the first frequency is different from the second frequency and/or the first phase is different from the second phase.

In embodiments, the camera is an infrared camera.

In embodiments, the first lock-in device and/or the second lock-in device are implemented digitally. They may, for example, be implemented by a software algorithm on a processing device.

Alternatively, the first lock-in device and/or the second lock-in device comprise analog circuits comprising a mixer for mixing a pixel signal of the acquired images with the respective first or second reference signal followed by a low pass filter.

In embodiments, the irradiating device is a light source comprising a plurality of LEDs or lasers.

In embodiments, the LEDs or lasers are positioned in a ring around the camera.

In embodiments, one of the LEDs or lasers is positioned substantially in a center of the ring.

In embodiments, the irradiating device is a heating device.

In embodiments, the system comprises at least one additional signal generator and at least one additional irradiation device for irradiating the semiconductor device. The at least one additional signal generator is configured for switching on and off the at least one additional irradiating device with at least one additional frequency different from the first and the second frequency.

For each additional signal generator, the system comprises at least one additional lock-in device configured for lock-in averaging the acquired images with the at least one additional reference signal having the at least one additional frequency to obtain a topography of the surface of the semiconductor device. The additional lock-in device may be implemented digitally. It may, for example, be implemented by a software algorithm on a processing device.

In embodiments, the additional irradiation devices may allow multimodal imaging by illuminating the semiconductor device with different frequencies and/or by illuminating the semiconductor device and heating the semiconductor device at different frequencies.

In embodiments, the system may comprise a processing device programmed for fusing images from the different lock-in devices.

In embodiments, the processing device may additionally be programmed for localizing one or more defects on one or more locations in the semiconductor device by determining where the obtained amplitudes are larger than a predefined threshold.

Aspects of the disclosure are set out in the accompanying independent and dependent claims. Features from the dependent claims may be combined with features of the independent claims and with features of other dependent claims as appropriate and not merely as explicitly set out in the claims.

These and other aspects of the disclosure will be apparent from and elucidated with reference to the embodiment(s) described hereinafter.

BRIEF DESCRIPTION OF THE FIGURES

The above, as well as additional, features will be better understood through the following illustrative and non-limiting detailed description of example embodiments, with reference to the appended drawings.

Figure 1:
FIG. 1 illustrates an increased temperature around a defect in a semiconductor device, according to an example.

Any reference signs in the claims shall not be construed as limiting the scope.

In the different drawings, the same reference signs refer to the same or analogous elements.

All the figures are schematic, not necessarily to scale, and generally only show parts which are necessary to elucidate example embodiments, wherein other parts may be omitted or merely suggested.

DETAILED DESCRIPTION

Example embodiments will now be described more fully hereinafter with reference to the accompanying drawings.

That which is encompassed by the claims may, however, be embodied in many different forms and should not be construed as limited to the embodiments set forth herein; rather, these embodiments are provided by way of example. Furthermore, like numbers refer to the same or similar elements or components throughout.

The present disclosure will be described with respect to embodiments and with reference to certain drawings but the disclosure is not limited thereto. The drawings described are schematic and are non-limiting. In the drawings, the size of some of the elements may be exaggerated and not drawn to scale for illustrative purposes. The dimensions and the relative dimensions do not correspond to all embodiments of the disclosure.

The terms first, second, and the like in the description and in the claims, are used for distinguishing between similar elements and not necessarily for describing a sequence, either temporally, spatially, in ranking, or in any other manner. It is to be understood that these terms are interchangeable under appropriate circumstances and that the embodiments of the disclosure described herein are capable of operation in other sequences than described or illustrated herein.

Moreover, the terms top, under, and the like in the description and the claims are used for descriptive purposes and not necessarily for describing relative positions. It is to be understood that these terms are interchangeable under appropriate circumstances and that the embodiments of the disclosure described herein are capable of operation in other orientations than described or illustrated herein.

Reference throughout this specification to "one embodiment" or "an embodiment" means that a particular feature, structure, or characteristic described in connection with the embodiment is included in at least one embodiment of the present disclosure. Thus, appearances of the phrases "in one embodiment" or "in an embodiment" in various places throughout this specification are not necessarily all referring to the same embodiment, but may. Furthermore, the particular features, structures, or characteristics may be combined in any suitable manner, as would be apparent to one of ordinary skill in the art from this disclosure, in one or more embodiments.

Similarly, it should be appreciated that in the description of embodiments of the disclosure, various features of the disclosure are sometimes grouped together in a single embodiment, figure, or description thereof for the purpose of streamlining the disclosure and aiding in the understanding of one or more of the various aspects. As the following claims reflect, aspects can lie in less than all features of a single foregoing disclosed embodiment. Thus, the claims following the detailed description are hereby expressly incorporated into this detailed description, with each claim standing on its own as a separate embodiment of this disclosure.

Furthermore, while some embodiments described herein include some but not other features included in other embodiments, combinations of features of different embodiments are meant to be within the scope of the disclosure, and form different embodiments, as would be understood by those in the art. For example, in the following claims, any of the claimed embodiments can be used in any combination.

In the description provided herein, numerous specific details are set forth. However, it is understood that embodiments of the disclosure may be practiced without these specific details. In other instances, well-known methods, structures, and techniques have not been shown in detail in order not to obscure an understanding of this description.

In a first aspect, embodiments relate to a method for localizing one or more defects in a semiconductor device. A method may be used for detecting shunt sites in a solar cell or for detecting a short in an electronic circuit. The method is configured to localize defects which result in an increased temperature around the defect when the device is powered (also referred to as switched on).

Figure 2:
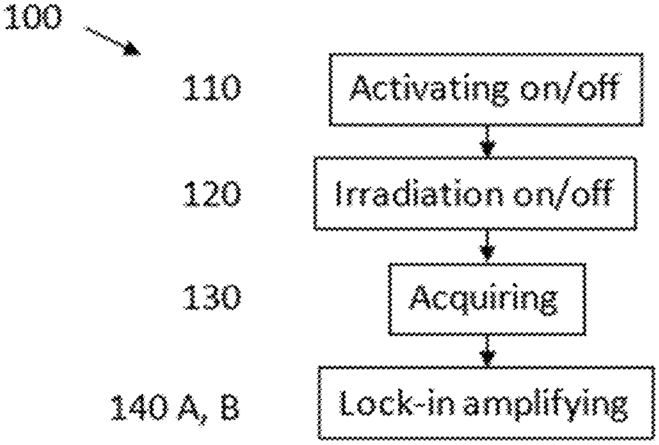
FIG. 2 shows a flow chart of a method, according to an example.

The steps of a method 100 is illustrated in FIG. 2.

The method 100 comprises switching 110 the semiconductor device on and off at a first frequency and meanwhile switching 120 an irradiating device, for irradiating the semiconductor device on and off at a second frequency.

While the semiconductor device is switched on and off at the first frequency and the irradiation device is switched on and off at the second frequency, images of the semiconductor device are acquired using a camera. In embodiments, the images are acquired at a frame rate which is at least twice the first frequency or the second frequency. In embodiments, the images comprise a plurality of pixels and for each pixel a pixel value is stored. In embodiments, the pixel value represents the intensity of the signal.

The method comprises lock-in averaging 140A the acquired images with a first reference signal having the first frequency and a first phase to obtain, per pixel of the image, an amplitude indicative of a temperature of the pixel at a surface of the semiconductor device.

In embodiments, this may, for example, be achieved by multiplying weighting factors such as the values of a sine, which has the first frequency and the first phase, with the pixel value of the consecutive images. The results are summed and low pass filtering may be applied to obtain a resulting image. The first phase is selected such that the obtained amplitudes of the pixels of the resulting image are indicative of the temperature of the corresponding pixels at the surface of the semiconductor device.

In embodiments, phase signals may be obtained by lock-in averaging the acquired images with the first reference signal. These phase signals are indicative of the depth location of the one or more defects in the semiconductor device. In embodiments, this may for example be achieved by multiplying the values of a cosine, which has the first frequency and the first phase, with the pixel value of the subsequent images. The results are summed and low pass filtering may be applied to obtain a resulting image of which the pixel values are indicative of a depth location of the one or more defects in the semiconductor device.

The method comprises lock-in averaging the acquired images with a second reference signal having the second frequency and the second phase to obtain a topography of the surface of the semiconductor device.

In an example, the first frequency is different from the second frequency and/or the first phase is different from the second phase.

The obtained pixel values may be amplified in the lock-in averaging step. In that case, this step may also be referred to as the lock-in amplification step.

Figure 3:
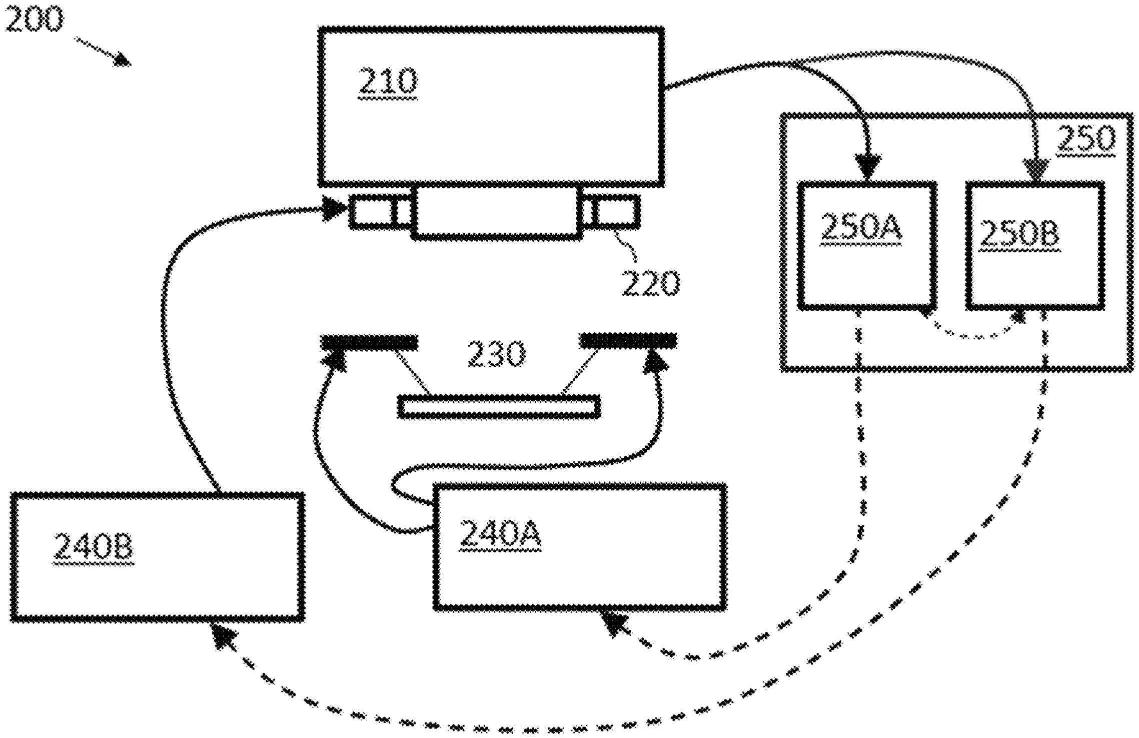
FIG. 3 shows a flow chart, according to an example.

In a second aspect, embodiments relate to a system for localizing one or more defects in a semiconductor device. A schematic drawing of a system is shown in FIG. 3.

The system 200 comprises a first signal generator 240A for powering the semiconductor on and off at a first frequency. In the example illustrated in FIG. 3, this first signal generator 240A is connected to needle probers. These needle probers are contacting the probe pads of the semiconductor device 230.

The system 200 also comprises a second signal generator 240B and an irradiating device 220 for irradiating the semiconductor device 230, wherein the second signal generator 240B is configured for switching on and off the irradiating device 220 at a second frequency. The irradiating device 220 may be configured for illuminating (e.g. with IR radiation) the semiconductor device 230 or for heating the semiconductor device 230 (e.g. with a laser or PCB heater).

The system 200, furthermore, comprises a camera 210 configured for acquiring 130 images of the semiconductor device 230.

The system 200, furthermore, comprises a first lock-in device 250A for lock-in averaging the acquired images with a first reference signal having the first frequency and a first phase to obtain amplitudes indicative of temperatures at a surface of the semiconductor device 230 and/or phase signals indicative of a depth location of the one or more defects in the semiconductor device 230. The obtained amplitudes and/or phase signals are induced by powering the semiconductor device 230 on and off.

The system 200, furthermore, comprises a second lock-in device 250B configured for lock-in averaging the acquired images with a second reference signal having the second frequency and a second phase to obtain a topography of the surface of the semiconductor device.

The system 200 is configured such that the first frequency is different from the second frequency and/or such that the first phase is different from the second phase.

In embodiments, the first signal generator 240A is synchronized with the first lock-in device 250A and the second signal generator 240B is synchronized with the second lock-in device 250B. This may be achieved by passing synchronization signals from the lock-in devices to the signal generators. Also, the phase difference between the first lock-in device 250A and the second lock-in device 250B may be set to a fixed value if the first frequency is equal to the second frequency. An implementation of the synchronization is illustrated by the dashed lines in FIG. 3.

In embodiments, the lock-in devices may be implemented digitally. The processing of the pixel values may be done by software on a processing device 250 (e.g., a microcontroller, a digital signal processor, or a field programmable gate array). In examples, the lock-in averaging is done in software, because each frame contains many signals (i.e. a signal per pixel). The signals that are coming from the camera 210 are generally in digital format, so it is more convenient to implement the lock-in averaging digitally. In embodiments, the camera 210 provides frames at a known frame rate to the processing device 250 (e.g. a control PC). The processing device 250 is configured to keep track of the received frames and to send trigger pulses at the right time to the signal generators 240 for turning on and off the semiconductor device 230 or for turning on and off the irradiating device(s) 220.

Alternatively, the first lock-in device 250A and/or the second lock-in device 250B may comprise analog circuits comprising a mixer for mixing a pixel signal with the respective first or second reference signal followed by a low pass filter.

Figure 4:
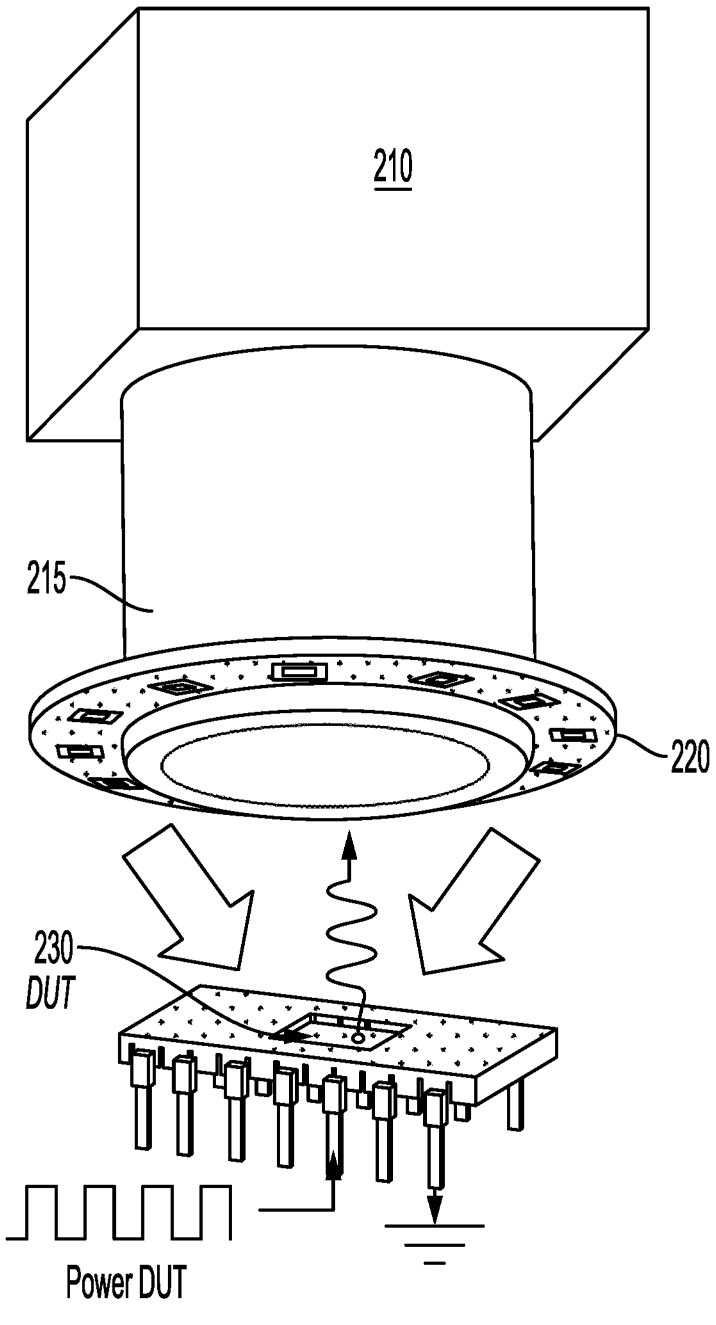
FIG. 4 shows a camera and a semiconductor device of a system, according to an example.

FIG. 4 shows elements of a system 200. In the FIG. 4, a camera 210 which comprises a lens 215 is facing a semiconductor device 230.

In embodiments, the camera 210 may be an infrared camera (e.g. sensitive for wavelengths from 780 nm to 1 mm), for example a mid-wave infrared camera (e.g. sensitive for wavelengths from 3 μm to 5 μm).

The semiconductor device 230 is mounted in a package and can be powered via bond pads.

In embodiments, the irradiating device 220 is a light source comprising a plurality of LEDs. The LEDs may for example be positioned around the lens 215 of the camera 210 as illustrated in FIG. 4. In embodiments, the LEDs may have a light emitting wavelength between 3 μm and 5 μm.

In embodiments, the irradiating device 220 may be a laser. In embodiments, the laser wavelength is greater than 1100 nm (i.e. having a band gap energy less than that of silicon), to avoid the generation of photoinduced carriers in the semiconductor device, which may upset the performance of the tested device.

In embodiments, the irradiating device 220 may be a heating device. In embodiments, the heating device has a low thermal mass (e.g. compared to the thermal mass of the semiconductor device 230), to enable high frequency analysis. The thermal mass may be at least 0.025 J/K or at least 0.010 J/K for a heater size of 20 mm×20 mm. The device may for example be heated and subsequently cool off at a frequency of at least 5 Hz or even at least 1 Hz.

Figure 5:
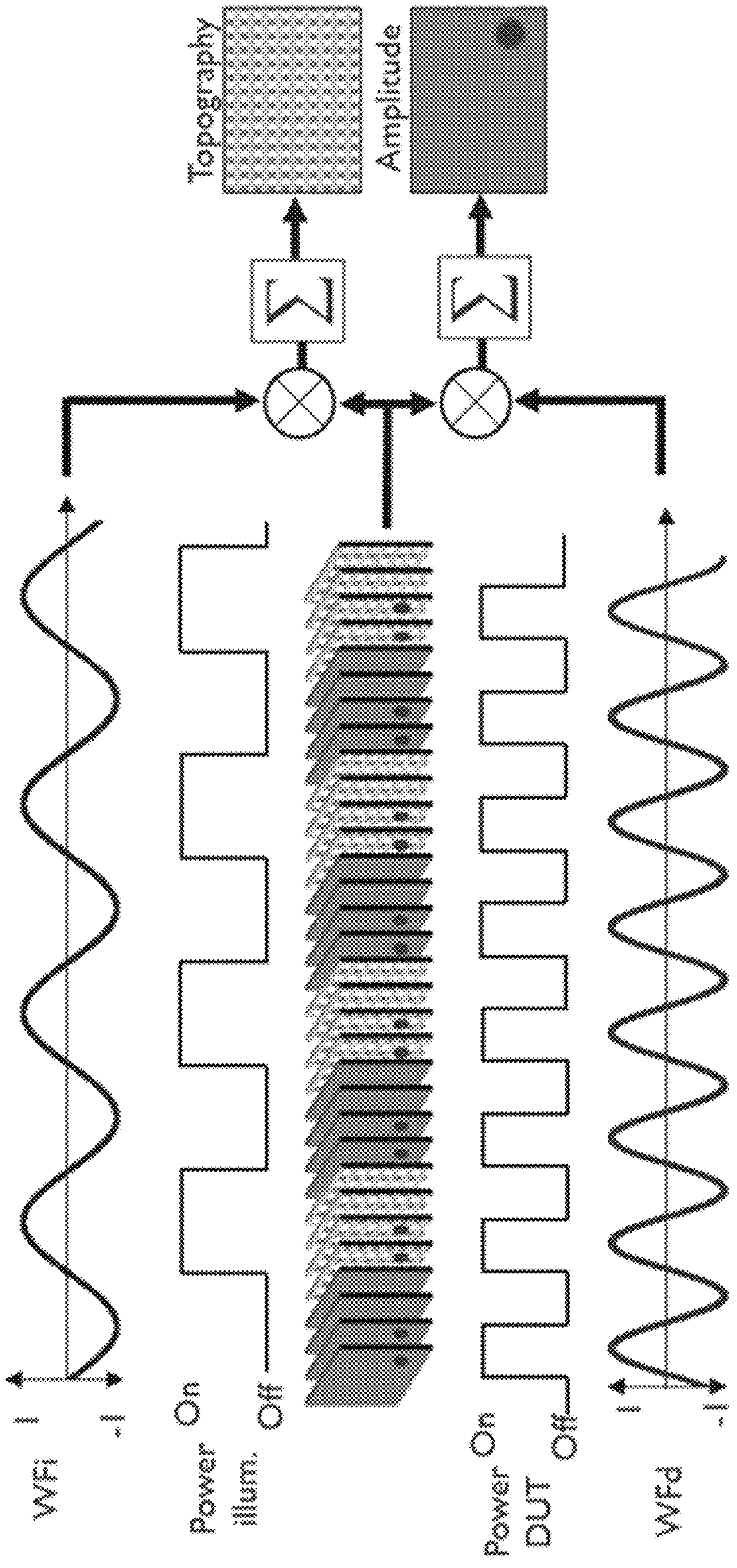
FIG. 5 schematically shows the different signals applied during a method, according to an example.

FIG. 5 schematically shows the different signals applied during a method. The semiconductor device 230 of FIG. 4 may be powered 120 on and off at a first frequency. This is illustrated by the square wave (Power DUT) in FIG. 5. Meanwhile the semiconductor device 230 is illuminated regularly by turning the irradiating device 220 on and off at a second frequency. This is illustrated by the square wave (Power illum.) in FIG. 5. Meanwhile, images are acquired 130 using the camera 210. In embodiments, the frame rate is at least twice the highest frequency in use. So, in this example the frame rate is at least twice the highest frequency selected from the first or the second frequency. The acquired images are shown in the middle of FIG. 5. The dot in these images are present at a position with an increased temperature due to the presence of a defect resulting in heating of that spot when the semiconductor device 230 is turned on. The images which have a raster are obtained when irradiating the semiconductor device 230. The lock-in device 250A and the lock-in device 250B are represented by the mixing signal and the summation signal. The first lock-in device 250A is lock-in averaging the acquired images with a first reference signal which has the first frequency and a first phase. In this case the first reference signal is a sine wave WFd (Weighting Factors device) with the first frequency and a first phase. The first phase is selected such that the sine wave is in phase with heating of the defect element. In this example, this phase is the same as the phase of the powering of the semiconductor device, but this is not necessarily the case, for example if there is a delay between the powering of the device and the heating of the defect element. The lock-in averaging 140A with the first reference signal may also result in a phase signal indicative of a depth location of the one or more defects in the semiconductor device 230. Generally, it can be said that as the defect is located deeper in the device, a larger phase shift will be induced, since it takes more time for the heat wave to travel towards the surface of the semiconductor device 230. In this case the second reference signal is a sine wave with the second frequency and a second phase. The second phase is selected such that the sine wave is in phase with illumination/heating of the semiconductor device 230. In case of illumination, the irradiating of the semiconductor device 230 and the sine wave WFi (Weighting Factors irradiation) are in phase. This is for the example illustrated in FIG. 5. In case of heating, there may be a delay between the irradiating of the semiconductor device 230 and the actual heating of the semiconductor device 230. In that case the sine wave WFi, which is in phase with the actual heating, may be delayed with respect to the irradiating of the semiconductor device 230.

Figure 6:
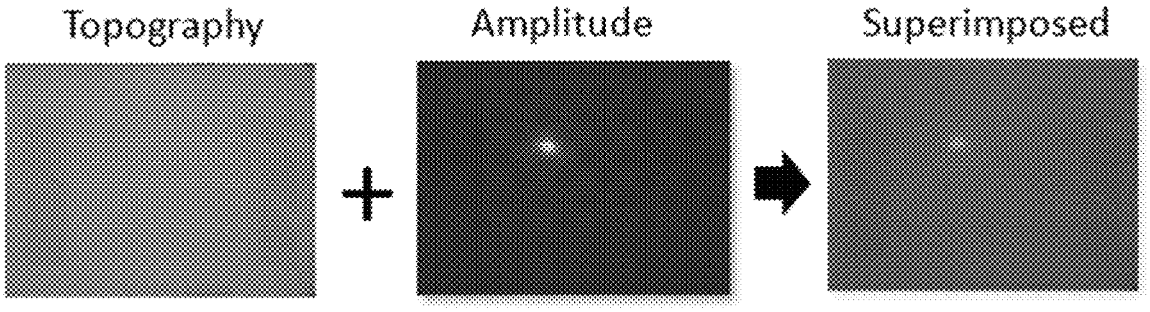
FIG. 6 (prior art)
FIG. 6 shows the topography and amplitude images obtained using a conventional lock-in thermography method, according to an example.

FIG. 6 shows the topography and amplitude images obtained using a conventional lock-in thermography method.

Figure 7:
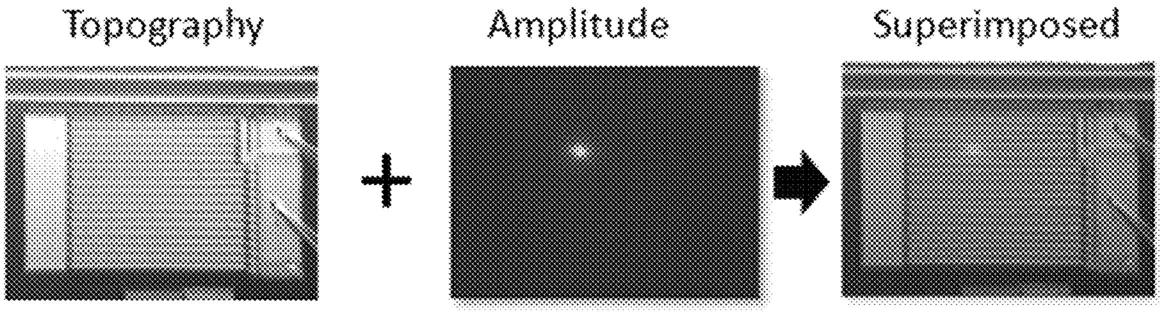
FIG. 7 shows the topography and amplitude images obtained using a method or device, according to an example.

FIG. 7 shows the topography and amplitude images obtained using a method or device in accordance with the present disclosure. It can be seen that simultaneously an image with an improved topographical contrast compared to FIG. 6 and an amplitude image for localizing a defect can be obtained. A method or a system in accordance with the present disclosure may be adapted for superimposing both images. It is noted that besides an amplitude image also a phase image may be obtained with the lock-in averaging 140A.

In embodiments, the processing device 250 may additionally be programmed for localizing one or more defects on one or more locations in the semiconductor device 230 by determining where the obtained amplitudes are larger than a predefined threshold.

In embodiments of the present disclosure the system 200 may comprise at least one additional signal generator and at least one additional irradiation device for irradiating the semiconductor device 230. In these embodiments the at least one additional signal generator is configured for switching on and off the at least one additional irradiating device with at least one additional frequency different from the first and the second frequency. In these embodiments the system, moreover, comprises at least one additional lock-in device configured for lock-in averaging the acquired images with the at least one additional reference signal having the at least one additional frequency to obtain a topography of the surface of the semiconductor device 230. The lock-in devices may be implemented digitally for example by programming a processing device 250. In the description, reference is made to one processing device 250. It is noted that the functionality of the processing device 250 may be distributed over different processing modules. The processing device 250 may additionally be programmed for fusing images from the different lock-in devices. Image fusion may be done in software, and can leverage image processing algorithm models.

Figure 8:
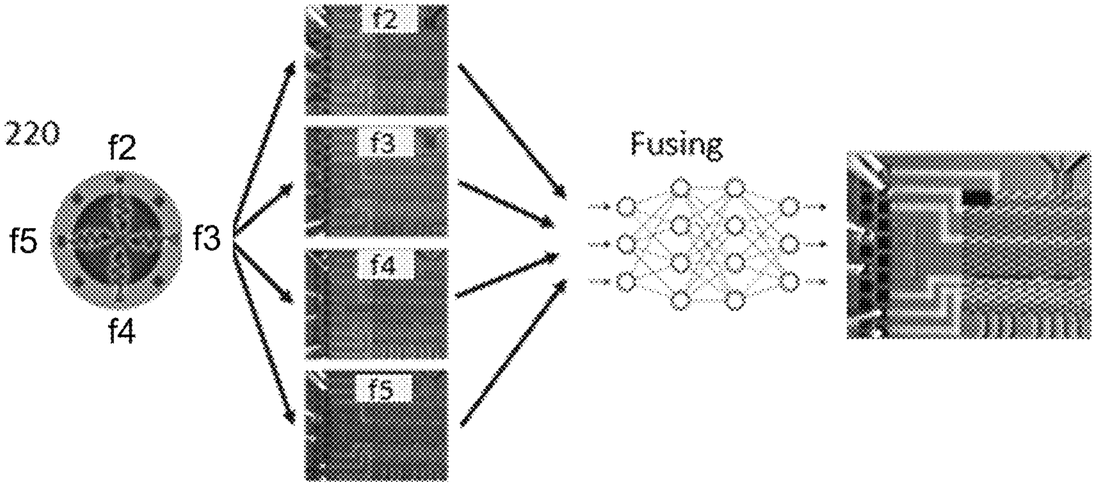
FIG. 8 illustrates multimodal imaging using a plurality of irradiating devices that are switched on and off at different frequencies, according to an example.

An example of a plurality additional irradiation devices is illustrated in FIG. 8. Besides the irradiation device 220 which is switched on and off at the second frequency f2 it comprises three additional irradiation devices which are switched on and off at three different frequencies f3, f4, and f5. After the lock-in averaging, four topographic images are obtained. These can be merged by a processing device 250 to obtain a merged topographic image.

Figure 9:
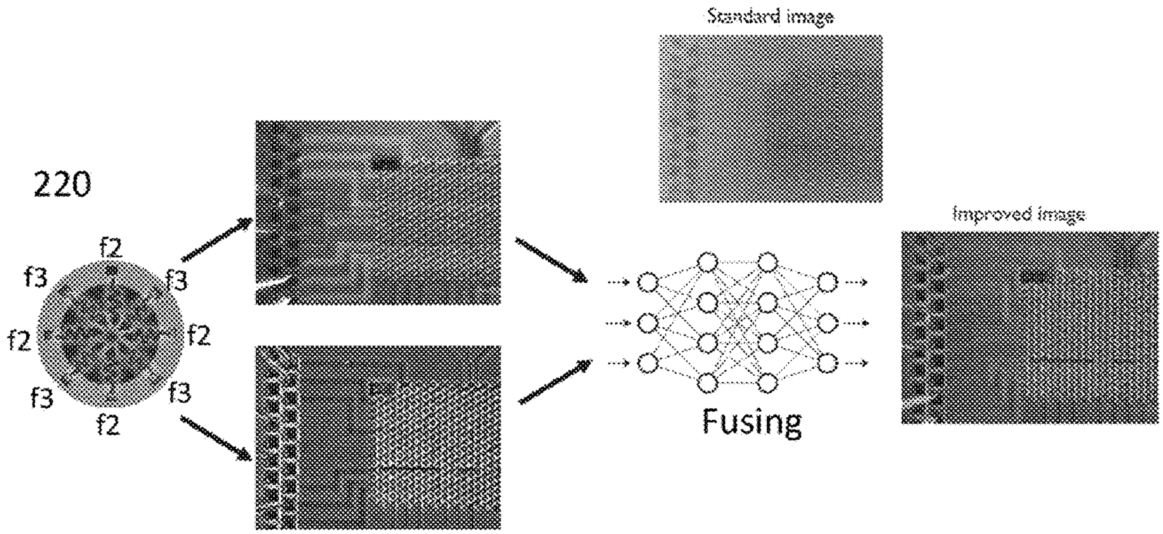
FIG. 9 illustrates multimodal imaging using different types of irradiating devices, according to an example.

In embodiments, one irradiating device 220 may comprise IR-LEDs and may be switched on and off at the second frequency f2 and an additional irradiating device 220 may comprise lasers for heating the semiconductor device. It may be switched on and off at a third frequency f3 different from the first and second frequency. An example thereof is illustrated in FIG. 9. The top left image is obtained after lock-in averaging with a reference signal with the second frequency, thus obtaining a topographic image with IR-LED illumination. The bottom left image is obtained after lock-in averaging with a reference signal with the third frequency, thus obtaining a topographic image with laser heating. After image fusion, the image at the right is obtained. This image has a better topographical contrast than the top image which is a standard integrated topography image.

Figure 10:
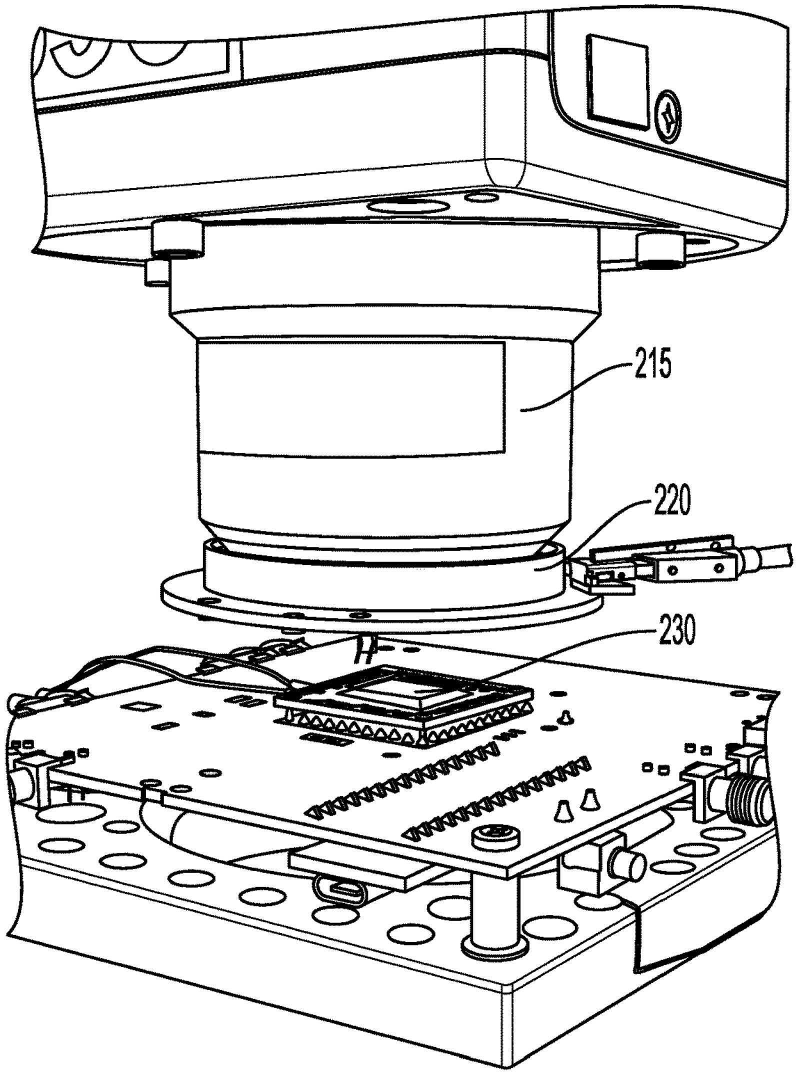
FIG. 10 shows an irradiating device mounted on a lens of a camera in front of a semiconductor device for use in a method or system, according to an example.
Figure 11:
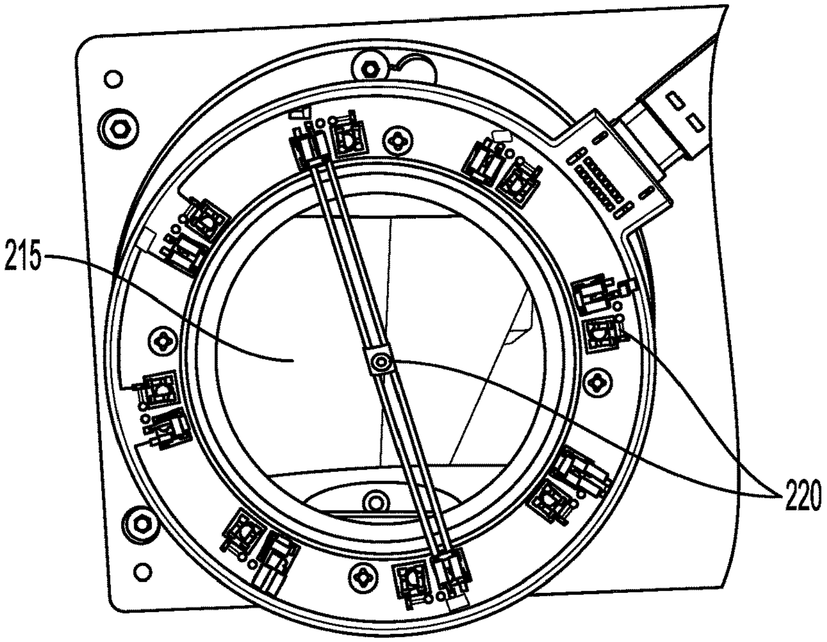
FIG. 11 shows the bottom view of the lens and irradiating device of FIG. 10, according to an example.
Figure 12:
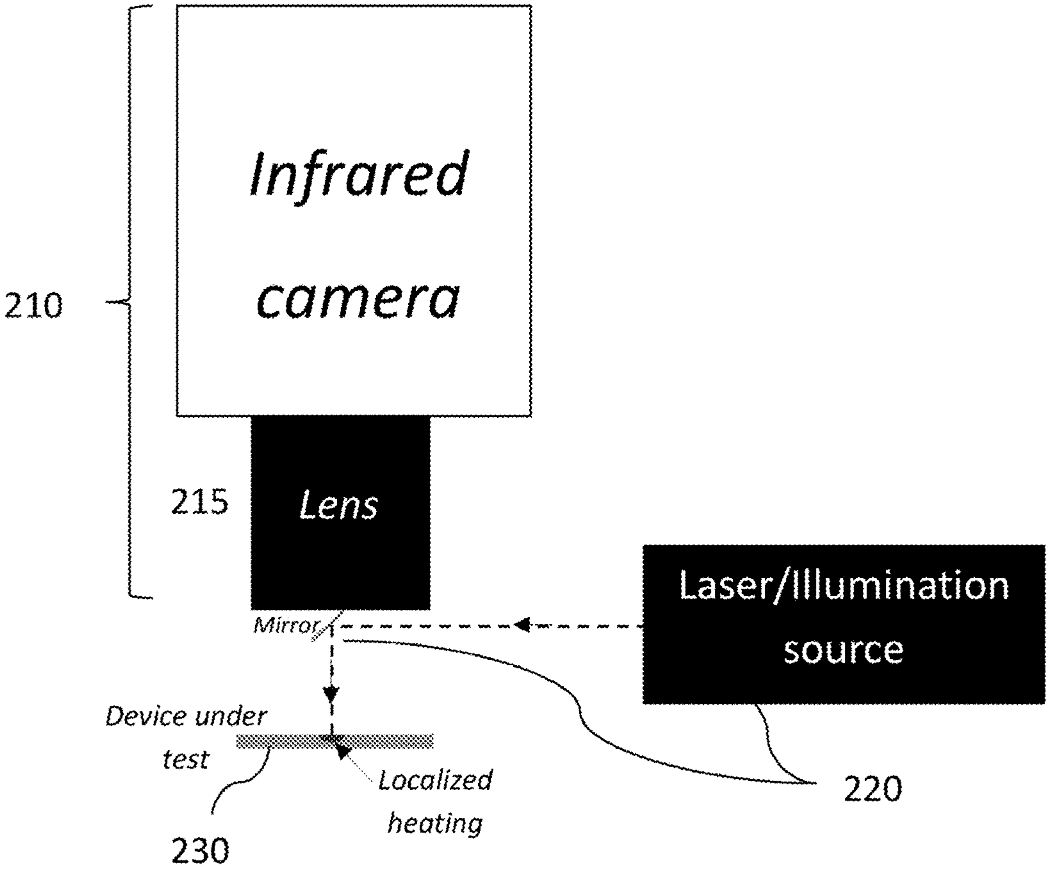
FIG. 12 shows an irradiating device for heating the semiconductor device for use in a method or system, according to an example.

FIG. 10 shows an irradiating device 220 mounted on a lens 215 of a camera. The lens 215 and the irradiating device 220 are mounted in front of a semiconductor device 230. The bottom view of the irradiating device 220 and the lens 215 is shown in FIG. 11. The irradiating device 220 is a ring light comprising a plurality of LEDs. In this irradiating device 220, an LED is also positioned at the center of the lens 215 for coaxial illumination. In embodiments, this LED may also be slightly off-centered. The offset may, for example, be selected as a function of the image field of view. The offset may, for example, be on the order of 1 mm to 5 mm.

In embodiments, a mirror may be positioned at the center of the lens 215 and the mirror and a laser/illumination source may be positioned such that light irradiated on the mirror is reflected onto the semiconductor device 230. The semiconductor device 230 may be subjected to localized heating where only that region of the semiconductor device that is within the camera's field of view is heated.

Figure 13:
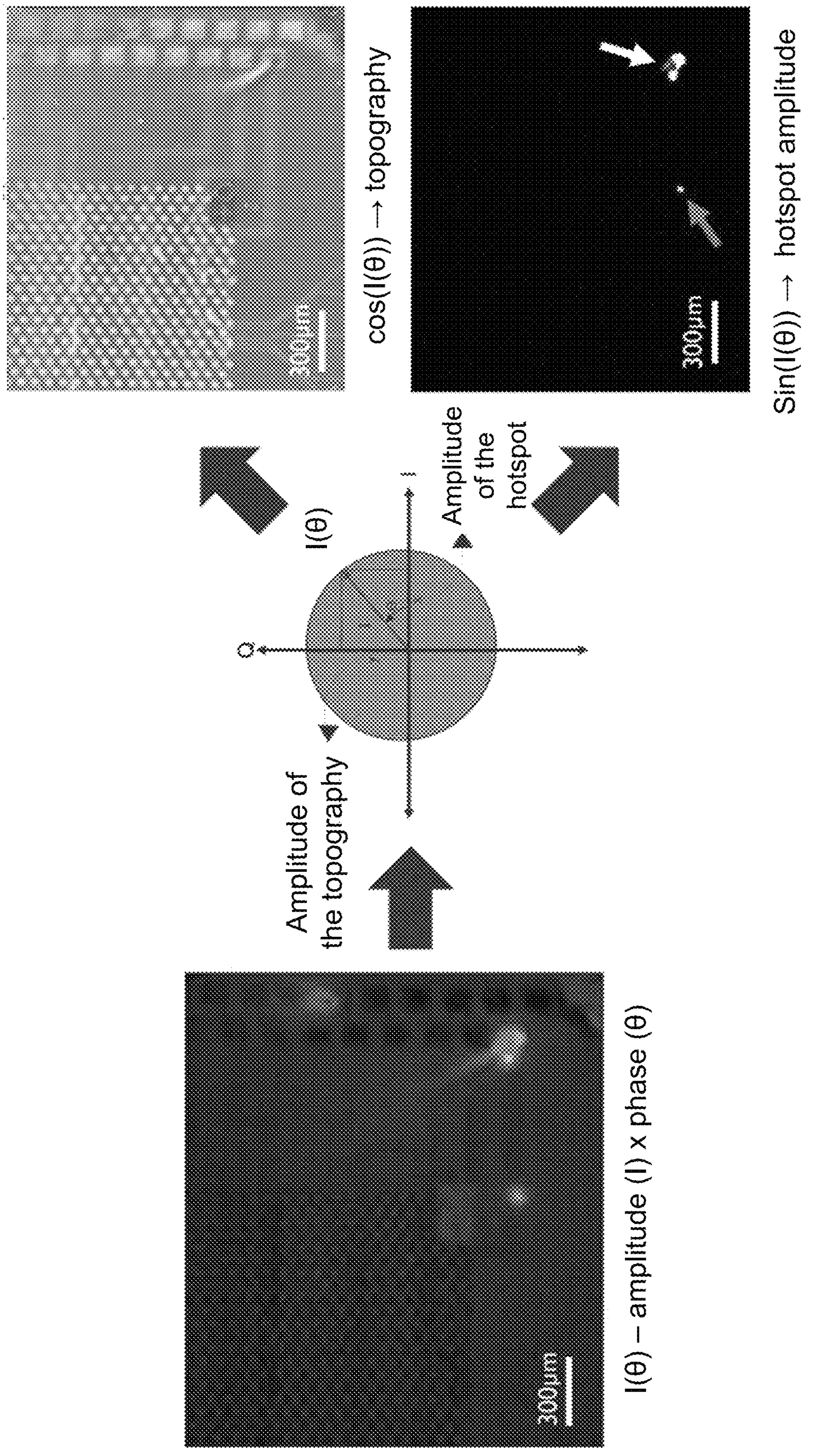
FIG. 13 illustrates images obtained using a method wherein the first frequency is equal to the second frequency and the on and off switching of the semiconductor device and the on and off switching of the irradiating device has a phase difference of 90°, according to an example.

In embodiments, the first frequency at which the semiconductor device 230 is switched on and off may be equal to the second frequency at which the irradiating device 220 is switched on and off, and the first phase is different from the second phase. In this technique, the on and off switching of the semiconductor device 230 and the on and off switching of the irradiating device 220 has a phase difference of 90°. An example of obtained images is shown in FIG. 13. The left image is obtained using the camera. To activate the irradiating device 220 with phase-shifted voltage bias, a switch comprising metal oxide semiconductor field effect transistors may be used.

Lock-in averaging is applied on the acquired images using a reference signal with the first phase to obtain an amplitude image resulting from the on and off switching of the semiconductor device 230 from which the hotspots can be derived (bottom right image of FIG. 13). Lock-in averaging is also applied on the acquired images using a reference signal with the second phase to obtain a amplitude image of the topography of the semiconductor device (top right image of FIG. 13).

In embodiments, amplitude (I) and phase ($\theta$) images resulting from the lock-in averaging may be multiplied by the processing device 250 to get complex data $I(\theta)$. This may be further evaluated by performing trigonometric analysis and individual images of low-noise lock-in topography and hotspot amplitude may be extracted.

It is a potential benefit of embodiments of the present disclosure that the measurement time can be reduced and the same throughput as classical thermography can be achieved while obtaining a topography image with improved contrast. It is, moreover, possible that the thermal budget of the failure analysis process is reduced compared to heat-assisted lock-in thermography.

Since, in embodiments of the present disclosure, the topography is obtained from the lock-in measurement, the data is averaged over several periods, and hence is less sensitive to input noise.

While some embodiments have been illustrated and described in detail in the appended drawings and the foregoing description, such illustration and description are to be considered illustrative and not restrictive. Other variations to the disclosed embodiments can be understood and effected in practicing the claims, from a study of the drawings, the disclosure, and the appended claims. The mere fact that certain measures or features are recited in mutually different dependent claims does not indicate that a combination of these measures or features cannot be used. Any reference signs in the claims should not be construed as limiting the scope.

What is claimed is:

1. A method comprising:

switching a semiconductor device on and off at a first frequency, switching an irradiating device on and off at a second frequency, thereby irradiating the semiconductor device, acquiring images of the semiconductor device using a camera, lock-in averaging the images with a first reference signal having the first frequency and a first phase to obtain amplitudes indicative of temperatures at a surface of the semiconductor device and/or to obtain phase signals indicative of a depth location of one or more defects in the semiconductor device, wherein the amplitudes and the phase signals are induced by the switching of the semiconductor device on and off, and lock-in averaging the images with a second reference signal having the second frequency and a second phase to obtain a topography of the surface of the semiconductor device, wherein the first frequency is different from the second frequency and/or the first phase is different from the second phase.

2. The method of claim 1, wherein the switching of the irradiating device is performed during the switching of the semiconductor device.

3. The method of claim 1, wherein acquiring the images comprises acquiring the images during the switching of the semiconductor device and during the switching of the irradiating device.

4. The method according to claim 1, wherein the first frequency is equal to the second frequency.

5. The method of claim 1, wherein the first phase is shifted at least 90° with respect to the second phase.

6. The method according to claim 1, wherein the first frequency is different from the second frequency.

7. The method according to claim 1, further comprising localizing the one or more defects at one or more locations by determining where the amplitudes are larger than a predefined threshold.

8. A system comprising:

a first signal generator configured for switching a semiconductor device on and off at a first frequency, an irradiating device, a second signal generator configured for switching the irradiating device on and off at a second frequency, a camera configured for acquiring images of the semiconductor device, a first lock-in device configured for lock-in averaging the images with a first reference signal having the first frequency and a first phase to obtain amplitudes indicative of temperatures at a surface of the semiconductor device and/or to obtain phase signals indicative of a depth location of one or more defects in the semiconductor device, wherein the amplitudes and the phase signals are induced by the switching of the semiconductor device on and off, and a second lock-in device configured for lock-in averaging the images with a second reference signal having the second frequency and a second phase to obtain a topography of the surface of the semiconductor device, wherein the first frequency is different from the second frequency and/or the first phase is different from the second phase.

9. The system according to claim 8, wherein the camera is an infrared camera.

10. The system according to claim 8, wherein the first lock-in device is implemented digitally.

11. The system of claim 8, wherein the second lock-in device is implemented digitally.

12. The system according to claim 8, wherein the first lock-in device comprises analog circuits comprising a mixer configured for mixing the images with the first reference signal and a low pass filter configured for processing the images after the mixing.

13. The system according to claim 8, wherein the second lock-in device comprises analog circuits comprising a mixer configured for mixing the images with the second reference signal and a low pass filter configured for processing the images after the mixing.

14. The system according to claim 8, wherein the irradiating device is a light source comprising a plurality of light emitting diodes or lasers.

15. The system according to claim 14, wherein the light emitting diodes or the lasers are positioned in a ring around the camera.

16. The system according to claim 15, wherein one of the light emitting diodes or lasers is positioned substantially in a center of the ring.

17. The system according to claim 8, wherein the irradiating device is a heating device.

18. The system according to claim 8, further comprising:

at least one additional irradiation device configured for irradiating the semiconductor device, at least one additional signal generator configured for switching on and off the at least one additional irradiation device with at least one additional frequency different from the first frequency and the second frequency, and at least one additional lock-in device configured for lock-in averaging the images with at least one additional reference signal having the at least one additional frequency to obtain a second topography of the surface of the semiconductor device.

19. The system according to claim 8, further comprising a processing device programmed for fusing images processed by different lock-in devices.

20. The system according to claim 19, wherein the processing device is additionally programmed for localizing the one or more defects by determining where the amplitudes are larger than a predefined threshold.

* * * * *